Figure 1:
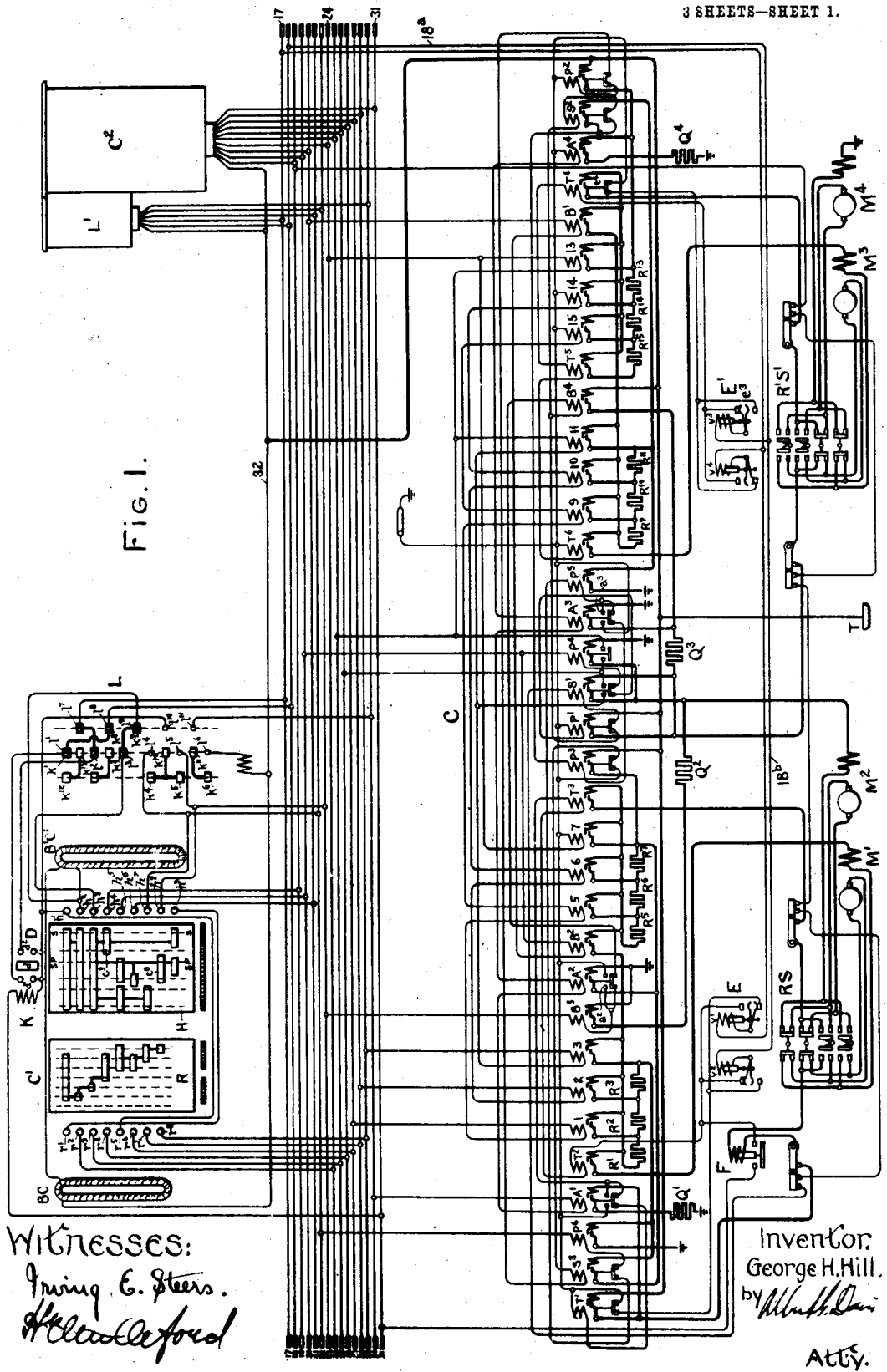

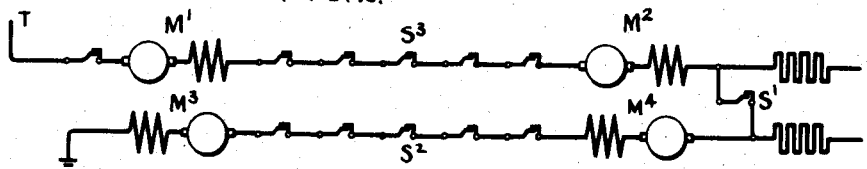
Fig. 2.
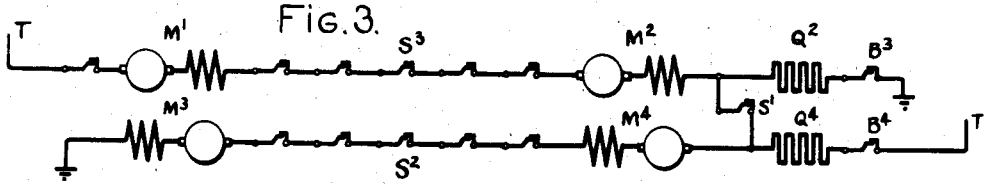
Fig. 3.
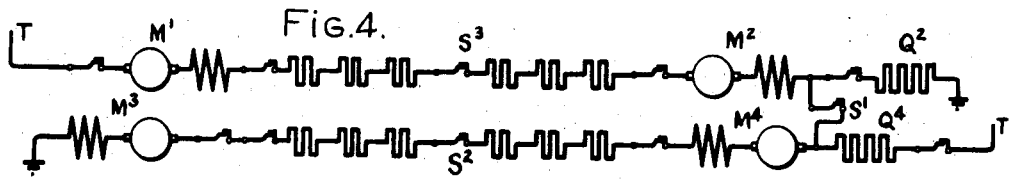
Fig. 4.
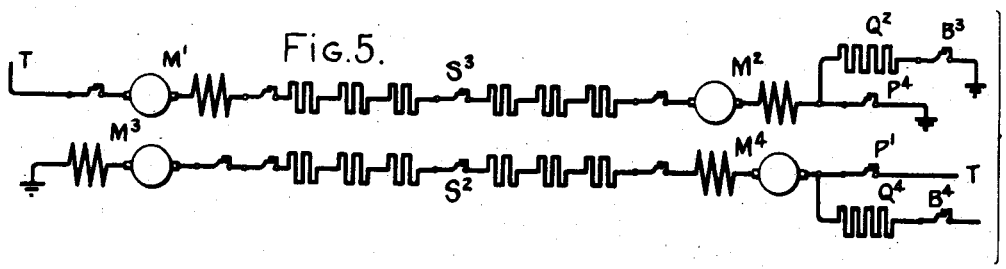
Fig. 5.
Fig. 6.
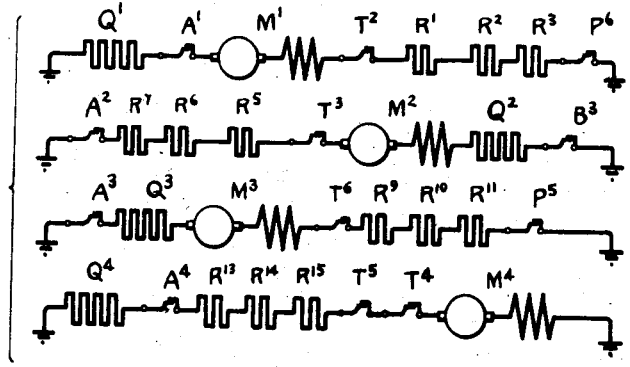

No. 872,939. PATENTED DEC. 3, 1907.
G. H. HILL.
SYSTEM OF MOTOR CONTROL.
APPLICATION FILED APR. 7, 1906.

3 SHEETS—SHEET 3.

Witnesses:
Irving E. Steers.
Helen Oxford

Inventor
George H. Hill.
by Albert G. Davis
Atty.

UNITED STATES PATENT OFFICE.

GEORGE H. HILL, OF SCHENECTADY, NEW YORK, ASSIGNOR TO GENERAL ELECTRIC COMPANY, A CORPORATION OF NEW YORK.

SYSTEM OF MOTOR CONTROL.

No. 872,939.   Specification of Letters Patent.   Patented Dec. 3, 1907.

Application filed April 7, 1906. Serial No. 310,414.

*To all whom it may concern:*

Be it known that I, GEORGE H. HILL, a citizen of the United States, residing at Schenectady, county of Schenectady, State of New York, have invented certain new and useful Improvements in Systems of Motor Control, of which the following is a specification.

The present invention relates to means for controlling a plurality of motors and particularly motors which are adapted at times to run as braking generators driven by the load. In electric railways, for example, it is advantageous to be able to retard the movement of the car or train by causing the propelling motors to generate current, not only for the purpose of braking upon failure of the usual air-brakes but also because in this way the wear and tear upon the wheels due to contact with brake shoes is avoided. This method of braking is of especial importance in locomotives adapted to run on lines having long grades wherein braking conditions may arise such that, if only the usual air-brakes were employed, the friction between brake shoes and the tires might heat the tires to such an extent as to loosen them, or the tires might be worn so thin as to be in danger of breaking. In either case disastrous results would follow upon an application of brake shoes under conditions quite safe for electric braking or combined electric brakes and ordinary braking.

The object of the present invention is to provide a reliable and efficient system for controlling motors both as motors and as generators.

In my prior application, Serial Number 230,634, filed Oct. 31, 1904, there is disclosed a system of control for motors particularly adapted for use on heavy locomotives and one in which an electric braking arrangement may well be employed.

In one of its aspects the present invention may be considered as comprising improvements in the system set forth in said application; although it is of course understood that the features of novelty constituting the present invention may be equally well employed in other systems.

In my prior system no means is provided for making a bridging connection in passing from series to parallel on account of the complications which such means would ordinarily involve.

A further object of the present invention is to make it possible to alter the motor connections from series through series-parallel and parallel without breaking the motor circuit and without the addition of complicated circuits and switch apparatus.

The present invention, therefore, comprises a novel construction and arrangement of parts in a system of control to be hereinafter described and particularly pointed out in the claims.

Figure 7:
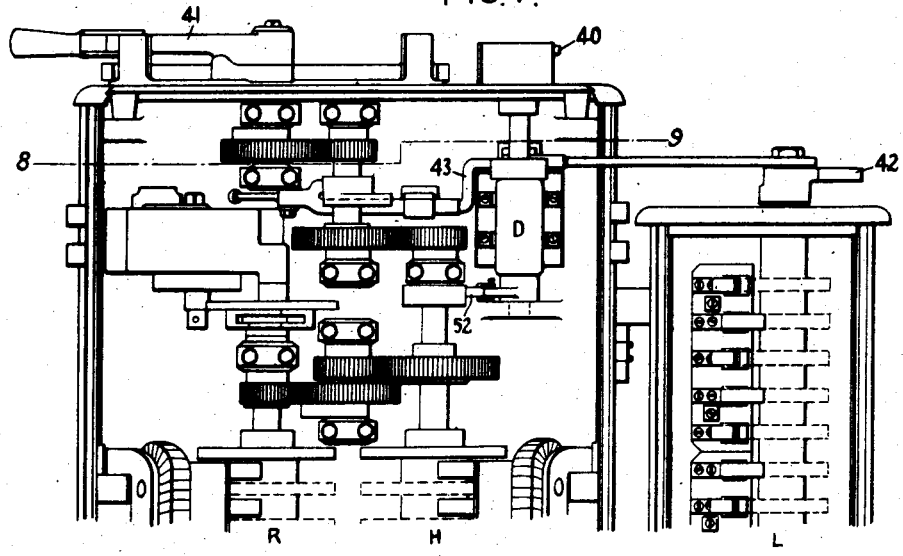
Figure 8:
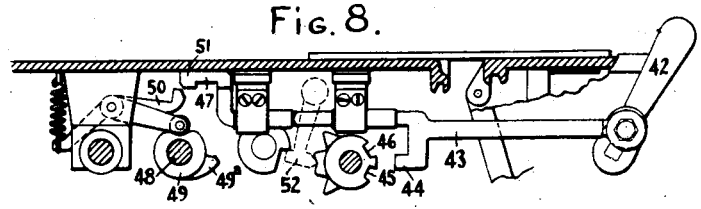
Figure 9:
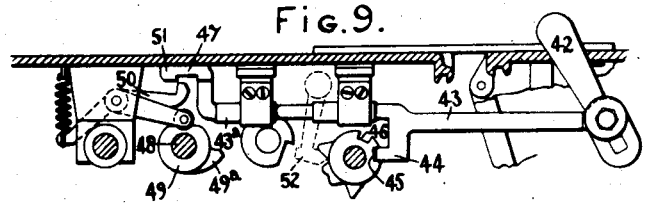

In the accompanying drawings, Figure 1 indicates diagrammatically a complete multiple unit control equipment for one car or locomotive arranged in accordance with the present invention; Figs. 2—6 are diagrams showing the motor circuits under various conditions; Fig. 7 shows in side elevation the operating means for the master controlling switch and the connections between these switches and the braking switch; and Figs. 8 and 9 are cross-sections taken on line 8—9, of Fig. 7, showing the handle of the brake switch in different operative positions.

The system shown in the drawings, except as modified by reason of the improvements constituting the present invention, is in all respects the same as that illustrated in my aforesaid application to which reference may be had for a more detailed description of the various old features.

Referring to the drawings, $M^1$, $M^2$, $M^3$ and $M^4$ are motors, preferably series motors.

C represents a motor controller of the separately-actuated contact type including line contacts $T^1$ to $T^6$, inclusive, series contacts $S^1$ to $S^3$, inclusive, parallel contacts $P^1$ to $P^6$, inclusive, bridging contacts $B^1$ to $B^4$, inclusive, contacts 1, 2, 3, 5, 6, 7, 9, 10, 11, 13, 14 and 15, governing resistance sections $R^1$, $R^2$, $R^3$, $R^5$, $R^6$, $R^7$, $R^9$, $R^{10}$, $R^{11}$, $R^{13}$, $R^{14}$ and $R^{15}$ and braking contacts $A^1$ to $A^4$, inclusive.

F is a throttle or overload relay which closes a circuit through a controller checking device K which may be of the type described in a patent to Frank E. Case, No. 801,214, October 10, 1905, for systems of motor control.

$C^1$ and $C^2$ are master controllers, the one being shown developed and the other outlined.

R S and $R^1 S^1$ are reversing switches having associated therewith interlocks E and $E^1$.

D indicates a master reversing switch.

L and $L^1$ are brake switches arranged to modify the control circuits when the motors are to be operated as braking generators.

T is a trolley or collector shoe which receives current from a stationary conductor. Any desired number of collecting devices may of course be employed.

The duplicate master switch devices are connected in multiple, to wires 17 to 31, inclusive, which extend throughout the length of the locomotive, and the actuating means for the reversing switch and motor controller are energized from these wires. The master controller consists preferably of two cylinders H and R controlling, respectively, the motor connections and the resistances. These cylinders are geared together so that the resistance cylinder revolves three times during the movement of the other cylinder from "off" to full parallel position. The cylinder H is provided with contact segments which coöperate with the stationary contacts $h^1$ to $h^9$, while contacts arranged upon the cylinder R coöperate with stationary contacts $r^1$ to $r^8$. The brake switch L comprises a number of fixed contacts indicated by small circles $l^1$ to $l^{11}$, together with coöperating movable contacts $k^1$—$k^{13}$. It will be seen that the fixed resistance controlling contacts in the master controller are directly connected to the train wires while a portion of the remaining fixed contacts of the master controller and the fixed contacts of the master reversing switch are connected to the train wires through the brake switch.

Assuming that it is desired to move the car or train to the right: the brake switch is made to occupy the position shown, if it has not previously been in such position, the movable member $d$ of the master reversing switch is moved into engagement with the fixed contacts $d^1$; and the master controller is brought into its first running position wherein the contacts along line $s$ of the cylinder H engage with the contacts $h^1$—$h^9$. A circuit may now be traced from current collector T to wire 32, blow-out coil B C, blow-out coil $B^1 C^1$, contact $h^2$, movable controller contacts, contacts $h^1$, contacts $d$ and $d^{1c}$ of the master reversing switch, contacts $l^1$ and $k^1$ of the brake switch, contacts $l^8$ and $k^3$ of the brake switch, train wire 18, wire $18^a$, actuating coil $v^3$ of the reversing switch $R^1 S^1$, lower contact of interlock $e^3$, interlock $t^4$ of line contact $T^4$, to ground; thereby causing the reversing switch $R^1 S^1$ to be moved to the position shown and bringing the movable member of the interlock $e^3$ into position wherein it engages the upper of the fixed contacts. The maintaining circuit for the reversing switch now passes from the upper contact of interlock $e^3$, through the actuating coil of switch $T^4$, through the actuating coil of switch $T^5$, through the actuating coil of switch $T^6$, to ground. Similarly, a branch circuit passing from wire $18^a$, through wire $18^b$, causes the operation of reversing switch R S and the subsequent energization of line contacts $T^1$, $T^2$, $T^3$. Thus both reversing switches are operated and the line contactors T to $T^6$ closed. A further circuit passing from the master controller is as follows:— from the connection between blow-out coil $B^1 C^1$ and contacts $h^2$, through contacts $l^9$, $k^9$, $l^3$ and $k^3$ of the brake switch, to contact $h^3$ of the controller and thence through the movable controller contacts $h^4$, train wire 19, and thence through the actuating coils of switches $S^1$, $S^2$ and $S^3$ to ground. Series switches $S^1$, $S^2$ and $S^3$ are therefore closed. And, by tracing the motor circuits, it will be found that the motors are connected across the line in series with each other and in series with all the resistance $R^1$ to $R^{15}$. As the master controller is rotated, the resistances are cut out step-by-step, until the motors remain in series across the line with no resistance in circuit. As the controller is turned into the series parallel position, namely, in the position wherein the movable contacts engage with the fixed contacts along line $s\ p$, movable contact $c^8$ engages with fixed contact $h^8$ before movable contact $c^3$ leaves fixed contact $h^3$. Thus, before the series contacts are opened, current flows from master controller out of contact $h^8$ to train wire 23, and thence through actuating coils of switches $B^3$, $B^4$, $S^2$, $S^3$, to ground. Thus bridging contacts $B^3$ and $B^4$ are closed before any of the series contacts are opened and the maintaining circuit for series contacts $S^2$ and $S^3$ is established. The motor connections are now as indicated in Fig. 3, namely, contact $S^1$ remains closed, and motors $M^1$ and $M^2$, one terminal of which is already connected to the current collector, have their other terminal connected to ground through resistance $Q^2$, while motors $M^3$ and $M^4$ are connected to the current collector through resistance $Q^4$. As the master controller continues to rotate, the resistance switches are opened, cutting in again all the resistance as indicated in Fig. 4, and when segment $c^3$ leaves fixed contact $h^3$, series switch $S^1$ is opened and the motors are left connected in parallel as indicated in Fig. 5. Thereafter the resistances are cut out and the motors connected in full parallel in a manner described in my application.

The arrangement provided for passing from series to series-parallel is of importance since it is impossible to so locate the speed-controlling resistances in such a manner that proper bridge connections may be made both in passing from series to series-parallel and from series-parallel to parallel without seriously complicating the controller. By utilizing a portion of the braking resistances, $Q^1$—$Q^4$, during one of the transition periods, only two contacts, $B^3$ and $B^4$, in addition to the contacts shown in my prior application are required to secure proper bridging connections.

It will be noted that if, while the train is running in the direction assumed, it is desired to cause the motors to act as braking generators, the master controller may be returned to its "off" position, opening all the circuits and then, if the brake switch is brought to the position wherein the left-hand row of movable contacts engages with the middle row of fixed contacts and the controller is again returned to its first running position, the circuit which previously passed through the master reversing switch to train wire 18 now, after reaching contact $l^1$, passes through contact $k^{12}$, contact $k^{13}$, contact $l^7$, to train wire 17; so that now the actuating magnets $v^1$ and $v^4$ of the reversing switches, instead of the magnets $v^2$ and $v^3$ will be energized, namely, the motor connections will be reversed. At the same time, by reason of contacts $k^3$ and $k^9$ leaving the corresponding fixed contacts, the series and parallel contacts of the master controller, which normally receive current through contact $h^3$, are maintained deënergized; but because contacts $k^4$, $k^5$ and $k^{10}$ engage respectively, with fixed contacts $l^4$, $l^5$ and $l^{10}$, current passes from contact $h^1$ to contact $l^{10}$ and thence through brakes switch contacts $k^{10}$, $k^4$ and $k^5$, and $l^4$ and $l^5$, to train wires 22 and 23. Current also flows from wire 32 through contacts $l^6$, $k^6$, $k^{11}$ and $l^{11}$ to train wire 30. From train wire 30 current flows through the actuating coils of switches $A^1$, $A^2$, $A^3$ and $A^4$, to ground; switches $A^1$, $A^2$, $A^3$ and $A^4$ being closed. Current also flows through train wire 22, through the actuating coils of contacts $P^6$ and $P^5$, through the upper contacts of interlock $a^3$ on the switch $A^3$, to ground. From wire 23, current flows through the actuating coil of contact $B^3$, through the upper contacts of interlock $a^2$ associated with contact $A^2$, to ground. The motors are now connected in individual closed circuits, each circuit including a group of main resistance sections and one of the auxiliary resistance sections $Q^1$ to $Q^4$. These motor circuits are indicated in Fig. 6. The master controller may now be operated so as to cut out the main resistance sections step-by-step. It will be noted that if at any time the braking current becomes too great, the circuit containing the coil of the checking device K will be completed so that no further resistance may be eliminated from the generator circuits until the current has diminished.

In Figs. 7, 8 and 9 I have indicated a suitable arrangement of master switch apparatus comprising: the master reversing switch D; the master controlling switch having cylinders R and H; and the brake switch L. The reversing switch is operated by a handle 40, the master controller by a handle 41, and the brake switch by a handle 42. A sliding rod 43 is connected to the handle of the brake switch and on this rod is arranged a tooth 44 adapted, when the brake switch is moved into braking position, to enter one of the notches 45 and 46 on the shaft of the cylinder of the reversing switch so as to lock the reversing switch in any desired running position. The member 43 is also provided with a hook 47, extending adjacent the shaft 48 forming part of the train of operating mechanism for the master switch. A cam 49 on the shaft 48 is adapted to move a dog 50 into engagement with the hook 47 or into engagement with the end 51 of the member 43 when the shaft 48 is turned out of its "off" position. Thus it will be seen that when the master controller is in its "off" position the brake switch is free to be operated to either its power or its braking position and, if it is moved into the braking position, it causes the reversing switch to be locked. As soon, however, as the handle 41 is moved out of the "off" position, the dog 50 is brought into operative engagement with the member 43 so that the brake switch is locked in the position to which it has been brought as long as the master controller is in a running position. The usual interlock 52 between the reversing switch and the master controller is provided so that the master switch is free to be rotated only when the reversing switch is in a running position. Also when the brake switch is in the braking position, the portion $43^a$ of the member 43 lies in the path of a lug $49^a$ on the cam 49 and prevents the controller from turning past full series position.

In operation, the handle of the brake switch is turned to the power position as indicated in Fig. 8, and then the reversing switch and master controller are free to be operated in the usual way, but, as soon as the master controller has been brought into running position the brake switch is positively locked. In case it is desired to operate the motors as braking generators, the controller is returned to the "off" position, thereby releasing the brake switch and the handle of the brake switch may then be brought to the braking position as indicated in Fig. 9. This operation of the brake switch locks the master reversing switch and as soon as the master controller is moved to cut out resistance the brake switch itself is locked. In this way all danger of careless operation of the switches in their improper order is avoided.

It will be seen that by reason of the present invention but slight modification need be made in the ordinary separately-actuated contact type control system in order to adapt it to control the motors, not only in the usual way, but also to cause them to act advantageously as braking generators.

Although I have described the best form of my invention now known to me, I do not desire to be limited to the particular construction and organization of parts illustrated except to the extent indicated in the appended claims, since in its broader aspects the invention may take various forms.

What I claim as new and desire to secure by Letters Patent of the United States, is,—

1. In a system of control, a motor or motors, a speed-controlling switch, a direction-controlling switch, a brake switch, and connections so arranged that the operation of the brake switch to the braking position causes the reversal of the connections of the motor or motors as determined by the direction-controlling switch.

2. In a system of control, a source of current supply, a motor or motors, a speed-controlling switch, a direction-controlling switch, a brake switch, and connections so arranged that when the brake switch is in one position the speed-controlling switch and direction-controlling switch operate to connect said motor or motors to said source of current supply for either direction of rotation and to vary the speed of the motor or motors, while when the brake switch is in the other position the same operation of the other two switches causes the motor or motors to be connected as braking generators.

3. In a system of control, a source of current supply, a motor or motors, a speed-controlling switch, a direction-controlling switch, a brake switch, and connections so arranged that when the direction-controlling switch is in a running position and the brake switch in its power position the operation of the speed-controlling switch causes the motor or motors to be connected to said source of current supply for normal operation, while upon moving the brake switch to its braking position without changing the direction-controlling switch, the speed controller serves to cause the motor or motors to continue to operate as braking generators.

4. In a system of control, motors, a source of current supply, a series-parallel motor controller, a reversing switch, a master controller, a master reversing switch, a brake switch, and control connections so arranged that the operation of the master controller causes the motors to be successively connected in series and in parallel to said source of current supply in one position of the brake switch and in separate closed circuits in another position of the brake switch.

5. In a system of control, motors, a source of current supply, a series-parallel motor controller, a reversing switch, master switch-devices, a two-position brake switch, and connections such that same operation of the master switch devices causes the motors to be connected to said source of current supply first in series and then in parallel in one position of the brake switch and to connect the motors in separate closed circuits in the other position of the braking switch.

6. In a system of control, motors, a source of current supply, resistances, a series-parallel motor controller, a reversing switch, master switch-devices, a two-position brake switch, and connections such that same operation of the master switch devices causes the motors to be connected to said source of current supply first in series and then in parallel in one position of the brake switch and to connect the motors in separate closed circuits including said resistances in the other position of the braking switch.

7. In a controller, a speed-controlling switch, a reversing switch, a brake switch having power and braking positions, and means associated with said speed-controlling switch for locking said brake switch in either of its positions when the speed-controlling switch is in a running position.

8. In a controller, a speed-controlling switch, a reversing switch, a brake switch having power and braking positions, and means associated with said speed-controlling switch for locking both the reversing switch and the brake switch in either of their operative positions when the controlling switch is in a running position.

9. In a controller, a speed-controlling switch, a reversing switch, a brake switch having power and braking positions, means associated with said speed-controlling switch for locking both the reversing switch and the brake switch in either of their operative positions when the speed-controlling switch is in a running position, and means associated with the brake switch for locking the reversing switch in either operative position when the brake switch is in the braking position.

10. In a controller, a speed-controlling switch, a reversing switch, a brake switch having power and braking positions, means associated with the brake switch for locking the reversing switch in either position, and means for locking the speed-controlling switch against movement beyond an intermediate position when the brake switch is in the braking position.

11. In a controller, a speed-controlling switch, a reversing switch, a brake switch having power and braking positions, means associated with said speed-controlling switch for locking both the reversing switch and the brake switch in either of their operative positions when the speed-controlling switch is in a running position, means associated with the brake switch for locking the reversing switch in either operative position when said brake switch is in its braking position, and means for locking the speed-controlling switch against movement beyond an intermediate position when the brake switch is in the braking position.

12. In a control system, a source of current supply, motors, variable resistances, a motor controller, a reversing switch, master switch-devices, a two-position brake switch, brake resistances, and connections such that the same operation of the master switch-devices causes the motors to be connected to said source of current supply in series and in parallel with said variable resistance in circuit in one position of the brake switch and in the other position of the brake switch causes the motors to be connected in separate closed circuits including said variable resistance and said braking resistance.

13. In a system of control, a source of current supply, motors, a resistance, a motor controller of the separately-actuated contact type, a master controller and control circuits connecting said master controller to said motor controller for causing the motors to be connected to the source of current supply with said resistance in circuit and said resistance to be gradually eliminated, and a brake switch arranged to alter the control circuits so as to cause the motor controller to short-circuit the motors through said resistance and said resistance to be gradually eliminated during the normal operation of the master controller.

14. In a system of control, a source of current supply, a plurality of motors, resistances, a motor-controller of the separately-actuated contact type, a master controller and control circuits arranged to cause the motor controller to operate to connect the motors to said source of current supply in series with each other and with said resistances and then to eliminate said resistances and connect the motor in parallel with said resistances in circuit, and a brake switch arranged to alter said control circuits so that during normal operation of the master controller the motors are connected in separate circuits independent of said source of current supply and including said resistances.

15. In a system of control, a source of current supply, motors, resistances, a motor controller of the separately-actuated contact type, a master controller, control circuits between said master controller and said motor controller so arranged that the operation of the master controller causes the motors to be successively connected in series and in parallel to said source with variable portions of said resistances in circuit, braking resistances, and a brake switch arranged to alter said control circuits so as to cause the motor controller to connect said motors in separate closed circuits independently of the source and with variable portions of the first named resistances and the braking resistances included in said closed circuits.

16. In a system of control, a source of current supply, a motor, a motor controller, a reversing switch, a master controller, a master reversing switch, control circuits between said controller and switches arranged to cause the motor to be connected to the source of current supply for either direction of rotation upon the proper operation of the master reversing switch and of the master controller, and a brake switch arranged to alter said control circuits so that the normal operation of the master controller and of the master reversing switch causes the motor to be short-circuited with the windings connected in the opposite relation to that indicated by the position of the master reversing switch.

17. In a system of control, a motor, a reversing switch, a pair of electromagnets for operating said switch, a master reversing switch and control circuits so arranged that in one running position of the master switch one electromagnet is energized while the other electromagnet is energized in the other running position of the master switch, and a brake switch arranged to vary the said control circuits so that in either running position of the master switch the electromagnet corresponding to the other running position of the switch is operated.

18. In a system of control, a source of current supply, a motor, a motor controller of the separately-actuated contact type, a reversing switch, a pair of electromagnets for actuating said reversing switch, a master controller, a master reversing switch, connections arranged to cause one of said magnets to be operated in one running position of the master reversing switch and the other magnet to be operated in the other running position of the master reversing switch, and control circuits to cause said motor to be connected to said source and its speed varied upon the operation of the master controller, and a brake switch arranged to reverse the connections between the master reversing switch and the electromagnets and to alter the control circuits so that the operation of the master controller short-circuits the motor.

19. In combination, a four-motor equipment, a source of current supply, a resistance, a controller arranged to connect the motors successively in series, series-parallel and in parallel to said source of supply, and to vary the amount of said resistance in the motor circuit, auxiliary resistances connected to adjacent terminals of two of the motors and on opposite sides of the switch connecting said motor terminals, and means for connecting the remaining terminals of said auxiliary resistances to opposite sides of the source of current supply before said switch is opened.

20. In combination, a four-motor equipment, a source of current supply, a resistance, a controller having contacts connected and arranged to connect the motors successively in series, in series-parallel and in parallel and to vary the amount of said resistance in the motor circuit, auxiliary resistances permanently connected to the motor circuit on opposite sides of a series switch, and contacts in said controller arranged to connect said auxiliary resistances to opposite terminals of the source of current supply before said series switch is opened.

21. In combination, a four-motor equipment, a source of current supply, a resistance, a motor controller having contacts arranged to successively connect the motors in series in series-parallel and in parallel and resistance-controlling contacts, auxiliary resistances connected to the motor circuit on opposite sides of a series contact, and contacts for connecting the auxiliary resistances to opposite sides of the source of current supply, certain of the parallel contacts being arranged to shunt said auxiliary resistances, the arrangement being such that the contacts for governing the auxiliary resistances are closed, then the resistance - controlling contacts opened and then the said series contact opened and the said parallel contacts closed.

22. In combination, motors, a source of current supply, resistance, a controller having a series contact, parallel contacts and resistance controlling contacts, auxiliary resistances connected to the motor on opposite sides of the series contact, contacts for connecting said auxiliary resistances to opposite sides of the source of current supply, and means for controlling said contacts in such a manner that the contacts for governing the auxiliary resistances are closed between the closing and subsequent opening of the said resistance-controlling contacts and before the said series contact is opened.

In witness whereof, I have hereunto set my hand this 6th day of April, 1906.

GEORGE H. HILL.

Witnesses:
BENJAMIN B. HULL,
HELEN ORFORD.